(12) United States Patent
Huijsing

(10) Patent No.: US 10,984,203 B1
(45) Date of Patent: Apr. 20, 2021

(54) GALLEY INSERT CONFIGURATION BY TAG

(71) Applicant: KONINKLIFKE FABRIEK INVENTUM B.V., Nieuwegein (NL)

(72) Inventor: Hans Huijsing, IJsselstein (NL)

(73) Assignee: Koninklifke Febriek Inventum B.V.

( * ) Notice: Subject to any disclaimer, the term of this patent is extended or adjusted under 35 U.S.C. 154(b) by 0 days.

(21) Appl. No.: 16/818,212

(22) Filed: Mar. 13, 2020

(51) Int. Cl.
| | | |
|---|---|---|
| *G06K 7/10* | (2006.01) | |
| *B64D 11/04* | (2006.01) | |
| *G06K 7/14* | (2006.01) | |
| *H04L 29/08* | (2006.01) | |

(52) U.S. Cl.
CPC .......... *G06K 7/10366* (2013.01); *B64D 11/04* (2013.01); *G06K 7/10297* (2013.01); *G06K 7/1417* (2013.01); *H04L 67/12* (2013.01)

(58) Field of Classification Search
None
See application file for complete search history.

(56) References Cited

U.S. PATENT DOCUMENTS

| | | | |
|---|---|---|---|
| 8,543,259 B2 | 9/2013 | Schalla et al. | |
| 8,686,876 B2* | 4/2014 | Shiomori | B64D 11/00155 340/945 |
| 2008/0120187 A1 | 5/2008 | Wesley et al. | |
| 2011/0090064 A1* | 4/2011 | Dahms | G06Q 10/00 340/10.42 |
| 2011/0220527 A1 | 9/2011 | Baatz | |
| 2015/0294227 A1 | 10/2015 | Digby-Jones et al. | |
| 2017/0038122 A1* | 2/2017 | Lu | B64D 11/04 |
| 2019/0210730 A1* | 7/2019 | Riedel | B64D 11/04 |
| 2020/0108932 A1* | 4/2020 | Vandewall | B64D 11/0007 |

FOREIGN PATENT DOCUMENTS

| | | |
|---|---|---|
| EP | 3192697 B1 | 6/2019 |
| WO | 2018077466 A1 | 5/2018 |

* cited by examiner

*Primary Examiner* — Kristy A Haupt
(74) *Attorney, Agent, or Firm* — Suiter Swantz pc llo

(57) ABSTRACT

A system for programming aircraft galley inserts via tags disposed around the galley includes a tag reader. Such tags may include RFID tags, QR codes, etc., or some combination thereof, and the tag reader comprises an optical sensor, near field communication device, or other RFID reader. The system utilizes the tags to identify the insert's location in the galley, available communications infrastructure and other properties of the galley, and other configurable aspects of the galley insert, and sets internal configurations accordingly. The system may be in data communication with an external processor. The system utilizes the tag, and communicates with the processor to determine a system configuration based on the tag.

15 Claims, 3 Drawing Sheets

GALLEY INSERT CONFIGURATION BY TAG

BACKGROUND

Aircraft galley inserts, such as ovens, need to be configured according to their location in the galley and other aspects of the galley configuration. Existing galley inserts are configured via "pin programming" (physically changing electrical connections on the galley insert), firmware/setting updates, etc. Those systems are expensive and not widespread on aircraft. Aircraft have variable galley architectures, and most aircraft are unsuitable to existing programming techniques.

SUMMARY

In one aspect, embodiments of the inventive concepts disclosed herein are directed to a system for programming aircraft galley inserts via tags disposed around the galley. Such tags may include radio frequency identification (RFID) tags, quick response (QR) codes, etc. The system utilizes from the tags to identify the insert's location in the galley, and other properties of the galley, and sets internal configurations accordingly.

In a further aspect, the system may be in data communication with an on-aircraft processor. The system utilizes the tag, and communicates with the processor to determine a system configuration based on the tag that is desirable to the processor.

In a further aspect, the tags may include data about available infrastructure. The galley insert may then make configuration changes based on that available infrastructure.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
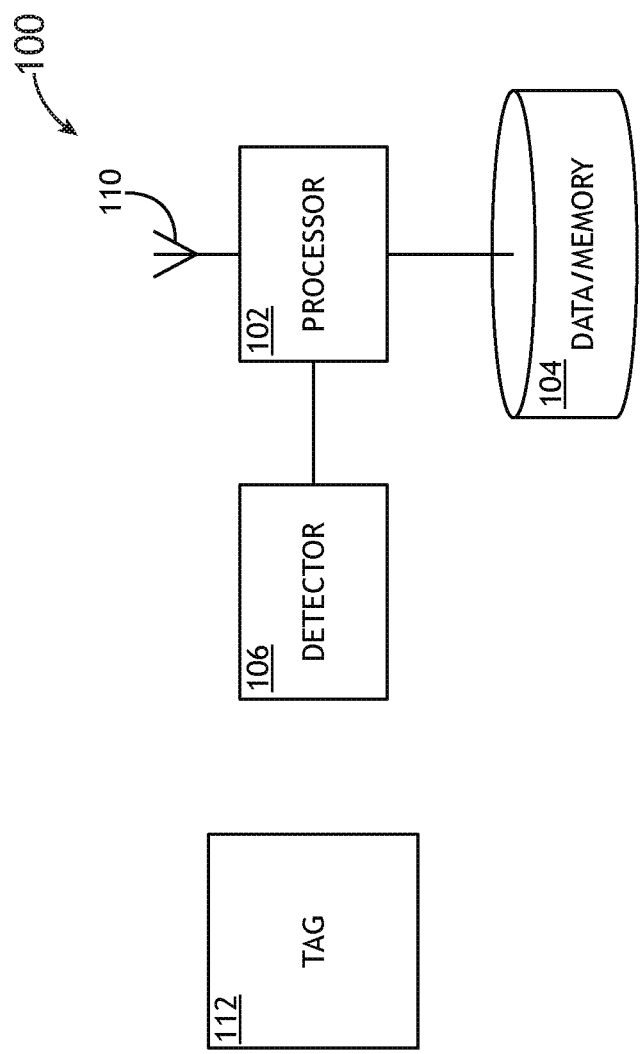
FIG. 1 shows a block diagram of a system according to an exemplary embodiment.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system for configuring aircraft galley inserts via tags disposed around the galley. Such tags may include RFID tags, QR codes, near-field communication (NFC) transmitters, etc. The system utilizes from the tags to identify the insert's location in the galley, and other properties, and sets internal configurations accordingly.

Referring to FIG. 1, a block diagram of a system 100 according to an exemplary embodiment is shown. The system 100 includes a processor 102, data storage/memory 104 connected to the processor 102 for embodying processor executable code and storing data as described herein, and a detector 106 connected to the processor 102. The system 100 is embodied in an aircraft galley insert such as an oven. The detector 106 is disposed in a surface of the galley insert such that the detector 106 is proximal to a corresponding tag 112 disposed on a corresponding wall of the aircraft galley. In at least one embodiment, the detector 106 is connected to an ARINC board in the aircraft galley insert.

In at least one embodiment, the detector 106 comprises an RFID tag reader and the tag 112 comprises an RFID tag, or an NFC tag and NFC tag reader (and/or NFC transmitter).

Alternatively, or in addition, the detector 106 comprises a camera or laser line reader and the tag 112 comprises a barcode or QR code.

The processor 102 comprises, or is in data communication with, a processor in the aircraft galley insert. The processor 102 (and/or processor) retrieves configuration data from the data storage/memory 104; the configuration data being associated with the tag 112. In one embodiment, where the tag 112 is a barcode or RFID tag or barcode, the signal produced by the detector 106 may comprise an ID associated with preloaded configuration data. Alternatively, or in addition, the tag 112 may encode configuration data directly. Configuration data may comprise identifying the aircraft galley insert as a primary or secondary insert.

Configuration data may comprise data corresponding to the location of the aircraft galley insert within the galley, or the aircraft, or both, the power feeder the galley insert is connected to, etc. In at least one embodiment, the data storage/memory 104 may store preloaded configuration data including location and power feeder data.

In at least one embodiment, the system 100 includes a data communication element 110 connected to the processor 102. The processor 102 may establish a datalink connection to a separate computer system (for example: within the aircraft, in a repair shop, etc.) to receive location and configuration data, send error log and power negotiation data.

Figure 2:
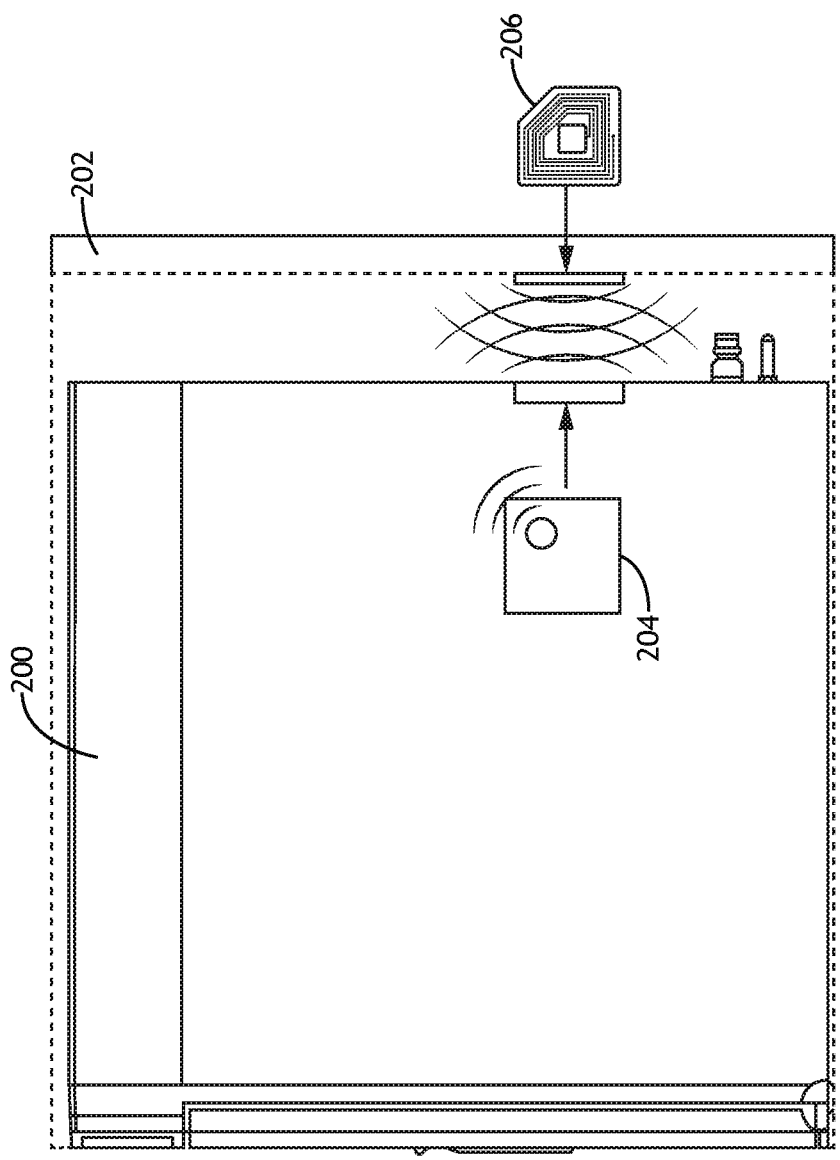
FIG. 2 shows an environmental view and block representation of an exemplary embodiment.

Referring to FIG. 2, an environmental view and block representation of an exemplary embodiment is shown. An aircraft galley insert 200, such as an oven, may be installed in an aircraft galley proximal to a galley wall 202 or galley monument. The aircraft galley insert 200 includes an RFID tag reader 204 disposed on a surface of the aircraft galley insert 200 proximal to the galley wall 202 when installed. The galley wall 202 includes an RFID tag 206 uniquely associated with its location on the galley wall 202 in the aircraft galley. The RFID tag reader 204 reads the RFID tag 206 to identify the installed location and/or other configuration information of the aircraft galley insert 200 and configure the aircraft galley insert accordingly. Configuration data may include an indication that the galley insert 200 is a primary or secondary insert; for example, when power negotiation is unavailable, a galley insert 200 configured as a primary insert may always run while a galley insert 200 configured as a secondary insert may not. Different possible configurations may be stored internally and applied when the RFID tag 206 returns a code corresponding to a stored configuration. The RFID tag reader 204 may be restricted to a power level preventing any interference outside the footprint of the aircraft galley insert 200.

Figure 3:
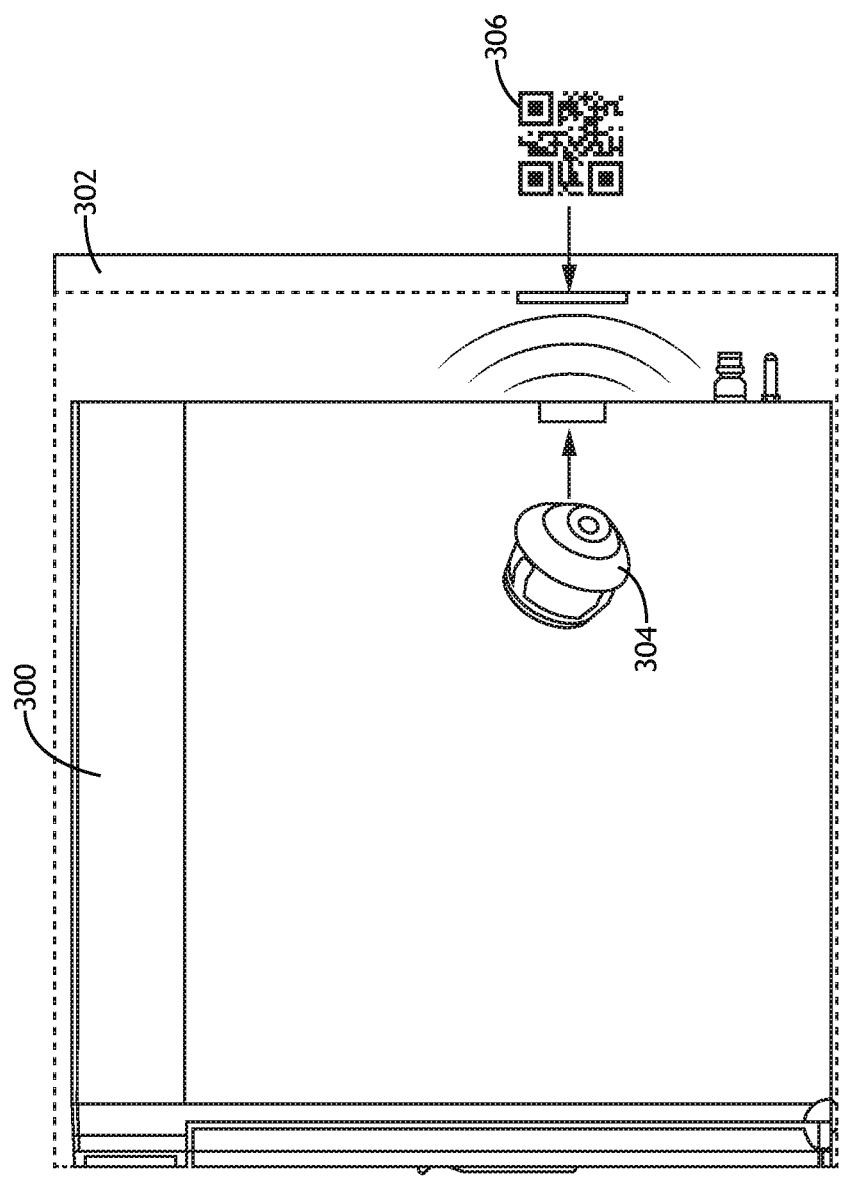
FIG. 3 shows an environmental view and block representation of an exemplary embodiment.

Referring to FIG. 3, an environmental view and block representation of an exemplary embodiment is shown. An aircraft galley insert 300, such as an oven, may be installed in an aircraft galley proximal to a galley wall 302 or other wall of the aircraft. The aircraft galley insert 300 includes a camera 304 (including, potentially, a laser scanner or barcode scanner) disposed on a surface of the aircraft galley insert 300 proximal to the galley wall 302 when installed. The galley wall 302 includes QR code or barcode 306 uniquely associated with its location on the galley wall 302 in the aircraft galley. The camera 304 reads the tag 306 to identify the installed location and/or configuration of the aircraft galley insert 300 and configure the aircraft galley insert accordingly. Such configuration data may be encoded in a QR code tag 306. The camera 304 may comprise a black and white camera with infrared capabilities to separate true black printing from any contaminants.

In at least one embodiment, the QR code or barcode 306 may also include an RFID tag as described herein.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A computer apparatus in a permanent aircraft galley insert comprising:
    at least one tag reader disposed in a surface of the aircraft galley insert; and
    at least one processor in data communication with the at least one tag reader and a memory storing processor executable code for configuring the at least one processor to:
        receive data from the tag reader corresponding to a tag;
        identify aircraft galley insert location-based configuration data based on the data received from the tag; and
        alter at least one setting of the aircraft galley insert based on the identified aircraft galley insert configuration data.

2. The computer apparatus of claim 1, wherein the at least one tag reader comprises a RFID tag reader.

3. The computer apparatus of claim 1, wherein the at least one tag reader comprises an optical scanner configured to read QR codes.

4. The computer apparatus of claim 3, wherein the at least one tag reader further comprises a RFID tag reader.

5. The computer apparatus of claim 1, wherein the aircraft galley insert configuration data corresponds to an in-galley location of the aircraft galley insert.

6. The computer apparatus of claim 1, further comprising a data communication device, wherein the at least one processor is further configured to:
    establish a datalink connection with an external repair shop computer system; and
    receive a data set including one or more tag identifiers and corresponding aircraft galley insert configuration data.

7. The computer apparatus of claim 6, wherein the at least one processor is further configured to send identified aircraft galley insert configuration data, power negotiation data, and one or more error logs to the aircraft computer system.

8. A system comprising:
    at least one tag reader disposed in a surface of a permanent aircraft galley insert;
    at least one tag disposed on an aircraft galley wall; and
    at least one processor in data communication with the at least one tag reader and a memory storing processor executable code for configuring the at least one processor to:
        receive data from the tag reader corresponding to a tag;
        identify aircraft galley insert location-based configuration data based on the data received from the tag; and alter at least one setting of the aircraft galley insert based on the identified aircraft galley insert configuration data.

9. The system of claim 8, wherein the at least one tag reader comprises an NFC tag reader.

10. The system of claim 8, wherein the at least one tag reader comprises an optical reader configured to read QR codes.

11. The system of claim 10, wherein the at least one tag comprises an in-galley location and primary or secondary classifier encoded as a QR code.

12. The system of claim 10, wherein the at least one tag reader further comprises a NFC tag reader.

13. The system of claim 8, wherein the aircraft galley insert configuration data corresponds to one or more ARINC 812 defined functions.

14. The system of claim 8, further comprising a data communication device, wherein the at least one processor is further configured to:
   establish a datalink connection with an aircraft computer system; and
   receive a data set including one or more tag identifiers and corresponding aircraft galley insert configuration data.

15. The system of claim 14, wherein the at least one processor is further configured to send identified aircraft galley insert configuration data, power negotiation data, and one or more error logs to the aircraft computer system.

* * * * *